United States Patent
Rudisil et al.

[19]

[11] Patent Number: 6,142,282
[45] Date of Patent: Nov. 7, 2000

[54] BRAKE-TRANSMISSION SHIFT INTERLOCK DEVICE FOR AN AUTOMATIC TRANSMISSION SYSTEM

[75] Inventors: Robert J. Rudisil, Plainfield; Tam Nguyen, Summit, both of Ill.

[73] Assignee: Pontiac Coil, Inc., Clarkston, Mich.

[21] Appl. No.: 09/228,319

[22] Filed: Jan. 11, 1999

[51] Int. Cl.[7] .................................................. B60K 41/26
[52] U.S. Cl. ..................................... 192/220.4; 192/220.2
[58] Field of Search ..................................... 335/251, 255; 192/220.5, 220.6, 220.7, 220.4

[56] References Cited

U.S. PATENT DOCUMENTS

| | | | |
|---|---|---|---|
| 4,887,702 | 12/1989 | Ratke et al. | 192/220.4 X |
| 5,096,033 | 3/1992 | Osborn | 192/220.7 X |
| 5,314,049 | 5/1994 | Nordstrom | 477/96 |
| 5,402,870 | 4/1995 | Osborn | 192/220.7 |
| 5,494,141 | 2/1996 | Osborn et al. | 192/220.4 |
| 5,671,638 | 9/1997 | Hattori et al. | 192/220.4 X |
| 5,718,312 | 2/1998 | Osborn et al. | 192/220.4 |
| 5,759,132 | 6/1998 | Osborn et al. | 192/220.4 X |
| 5,954,179 | 9/1999 | Osborn | 192/220.7 X |

*Primary Examiner*—Charles A Marmor
*Assistant Examiner*—Saúl Rodríguez
*Attorney, Agent, or Firm*—Cherskov & Flaynik

[57] ABSTRACT

A brake-transmission shift interlock device 10 for an automatic transmission system includes a solenoid 14 secured to a support member 12 that positions the solenoid 14 so as to block movement of a transmission member 176 to prevent a transmission shifter from being moved from a park position. The solenoid 14 includes a plunger 50 having first and second portions 76 and 78. The second plunger portion 78 engages the transmission member 176 laterally on a side wall 94 if the brake pedal is not depressed and the shifter is in the park position. To prevent the plunger 50 from binding, the second plunger portion 78 is allowed to axially offset from the first plunger portion 76 thereby reducing the required lineal force to move the plunger 50 from a first to a second position when the solenoid 14 is energized.

20 Claims, 11 Drawing Sheets

BRAKE-TRANSMISSION SHIFT INTERLOCK DEVICE FOR AN AUTOMATIC TRANSMISSION SYSTEM

BACKGROUND OF THE INVENTION

1. Field of the Invention

The present invention relates to a brake-transmission shift interlock device for an automatic transmission system and more particularly, to a device that includes a solenoid having a two part plunger with an exterior second portion of the plunger positioned to prevent movement of a transmission member thereby preventing operation of the transmission shifter until the brake is depressed.

2. Background of the Prior Art

Automatic transmissions are commonly used for controlling the modes of operation of an automobile including park, drive, reverse and neutral. The modes of operation are selected by moving a shifter, integrally mounted to the automatic transmission, to a position corresponding to the indicated mode. These modes of operation have simplified a driver's task when operating an automobile. However, experience has shown that it is possible for an automatic transmission to "slip" from a park mode to a drive mode without the driver moving the shifter, thereby compromising safety and possibly developing into a collision involving the automobile and an adjacent structure.

A well-known method in the art of correcting aforementioned problem is to employ an interlock device that allows the automatic transmission shifter to move from the park mode only when the automobile engine is running and the brake pedal is depressed. The interlock also allows the shifter to be moved back to the park mode irrespective of the shifter positions.

A well-known interlock device that accomplishes the above objective utilizes a solenoid such that when in a de-energized state, prevents movement of the transmission shifter, and when energized (by depressing the brake pedal) allows the shifter to move from the park position. To minimize the required lineal force to operate the solenoid thereby reducing the size of the solenoid, the solenoid was designed such that the travel of an internal plunger component of the solenoid, occurred in a horizontal line to minimize the effects of gravity on the plunger.

Although effective in correcting the above-stated problem, prior art interlocking devices were required to use relatively large solenoids to provide sufficient lineal force to overcome the binding of internal solenoid components caused by an external "blocking" component joined to a plunger component of the solenoid. The blocking component being utilized to impede the travel of a preselected transmission member thereby preventing operation of the transmission. These relatively large solenoids generate undesirable noise when operated and use components that "wear down" relatively quick. Examples of prior art designs are illustrated in U.S. Pat. Nos. 5,379,872; 5,309,744; 5,293, 763; 5,150,593; 5,036,962; 4,983,960; 4,638,279; and 1,768,518.

Therefore, a solenoid operated interlocking device is required that has less binding between internal solenoid components, requires less lineal force to operate, is relatively smaller in size and generates less noise than the prior art solenoids.

SUMMARY OF THE INVENTION

It is an object of the present invention to overcome many of the disadvantages associated with brake-transmission shift interlock devices for automatic transmission systems that employ solenoids to prevent operation of the transmission.

A principle object o the present invention is to provide a device that prevents an automatic transmission shifter from being moved from the park position unless the brake pedal is depressed. A feature of the device is a solenoid operator having relatively "small" dimension to remove an obstruction to the movement of a transmission member. An advantage of the device is the relative "noise-free" operation of the solenoid.

Another object of the present invention is to reduce the binding between components of the solenoid. A feature of the device is a two piece plunger component of the solenoid. An advantage of the device is the reduced binding between plunger and bobbin components of the solenoid.

Yet another object of the present invention is to reduce the lineal force required to operate the solenoid. A feature of the device is an axial offset plunger portion (in relation to a horizontal longitudinal axis of the solenoid) obstructing movement of a transmission member. An advantage of the device is the reduction of solenoid size and the corresponding reduction of power draw.

Yet another object of the present invention is to secure electrical conductors supplying power to the device. A feature of the device is a force fit of the conductors into apertures, and the securing of the conductors in the apertures by a pair of ribs that receive an edge portion of the enclosure receiving the conductors. An advantage o the device is the strain relief of the conductors at the enclosure entrance caused by movement of the device during transmission shifter operation.

Another object of the present invention is to limit wear on a component supporting a plunger portion blocking a transmission member. A feature of the device is a sleeve insert in a plunger support. An advantage of the device is increased service time and a corresponding decrease in solenoid repair.

Still another object of the invention is a limited supply voltage range. A feature of the device is a voltage regulating circuit board that supplies power to the solenoid coil. An advantage of the device is that a smaller coil design and corresponding smaller solenoid is required to operate the device in extreme temperature ranges.

Briefly, the invention provides a brake interrupt device for an automatic transmission system comprising a support member, a solenoid secured to said support member, said solenoid including a plunger member; means for moving said plunger member from a first position to a second position; means for moving said plunger member from said second position to said first position; means for preventing movement of an automatic transmission shifter; and means for preventing binding of said plunger thereby allowing movement of said plunger from said first position to said second position. dr

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DETAILED DESCRIPTION OF THE PREFERRED EMBODIMENT

Figure 1:
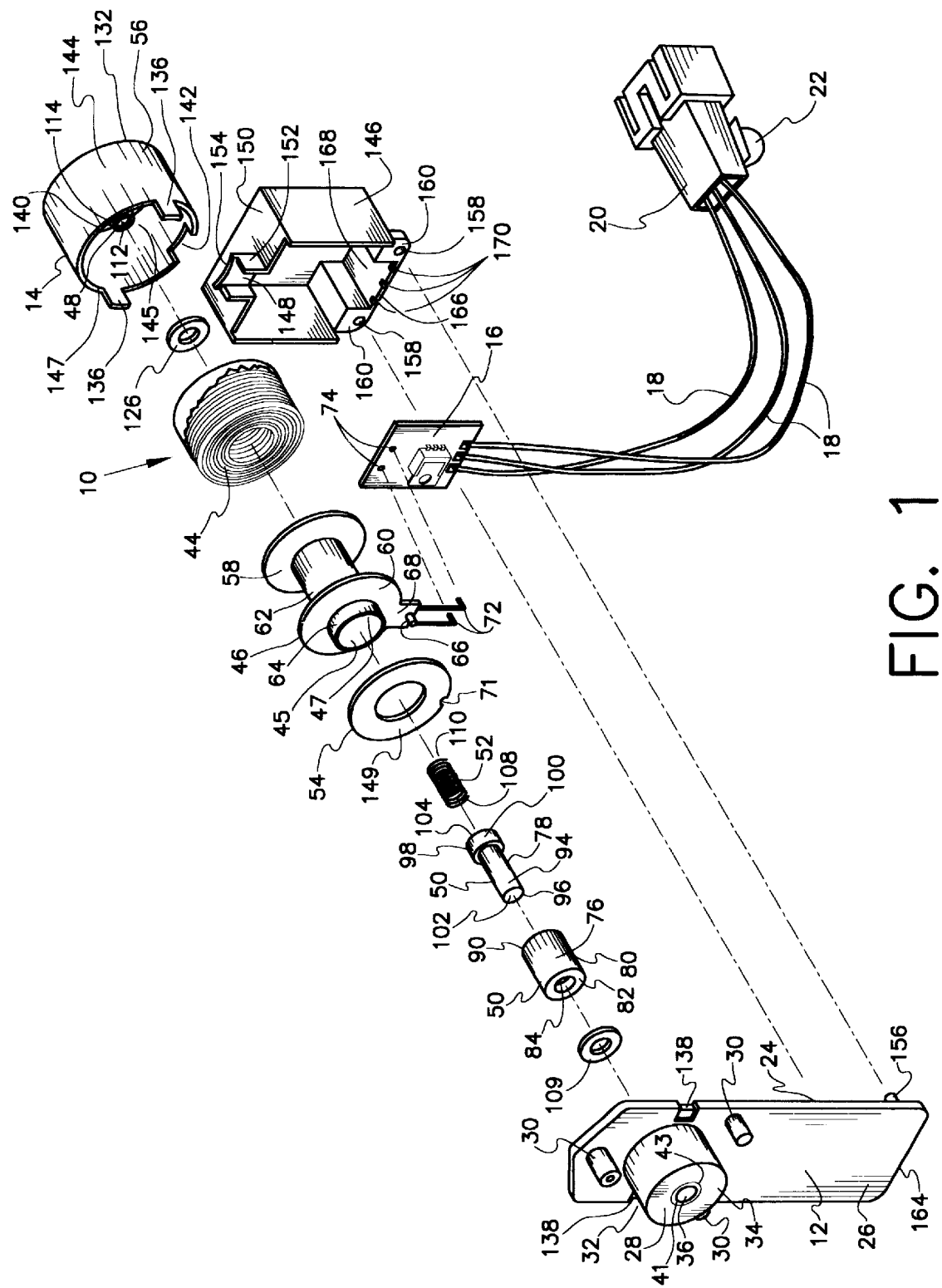
FIG. 1 is an exploded perspective view of a brake interrupt device for an automatic transmission system in accordance with the present invention.

Referring now the figures and in particular to FIGS. 1, a brake-transmission shift interlock device for an automatic transmission system is denoted by numeral 10. The device 10 includes a support member 12 and solenoid 14 that is activated from a 9.5 to 10.0 V.D.C. supply voltage provided by voltage regulating circuit board 16 which receives a voltage of 9.5 to 24 V.D.C. from three conductors 18 secured to a power receptacle 20 that attaches to a stationary component near an automatic transmission (not shown) via clip 22.

Figure 2:
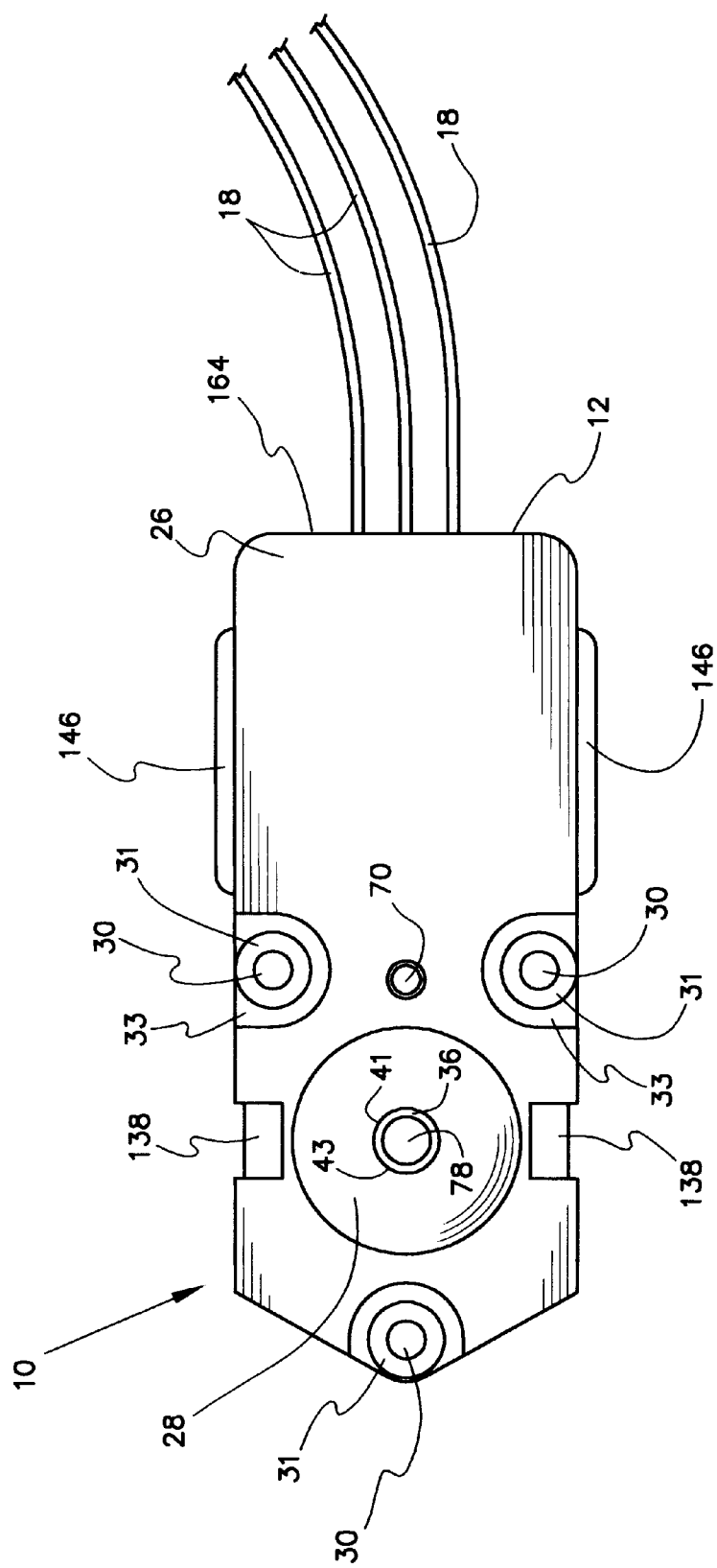
FIG. 2 is a front elevation view of for the device in accordance with the present invention.
Figure 3:
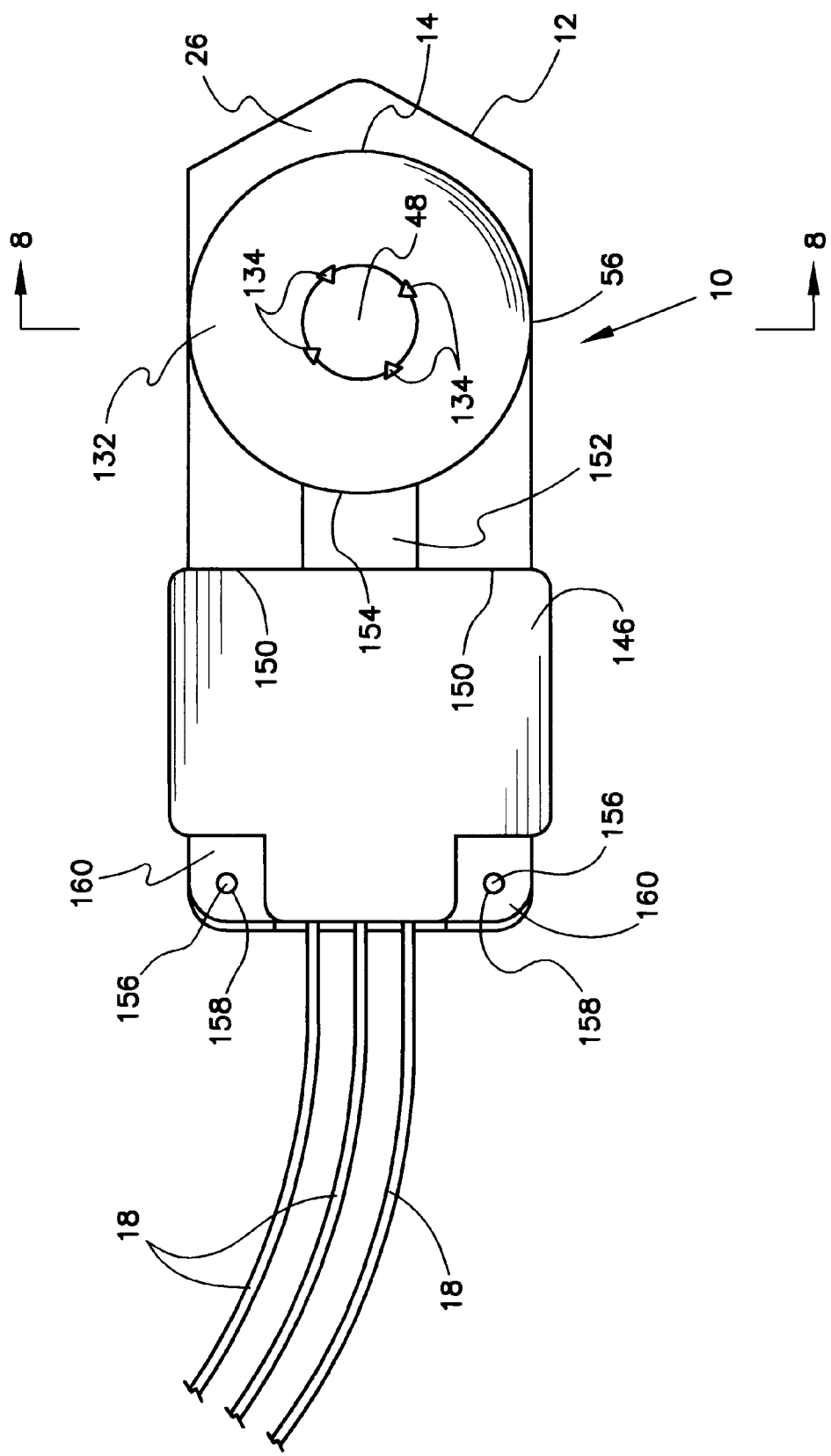
FIG. 3 is a back elevation view of the device in accordance with the present invention.
Figure 5:
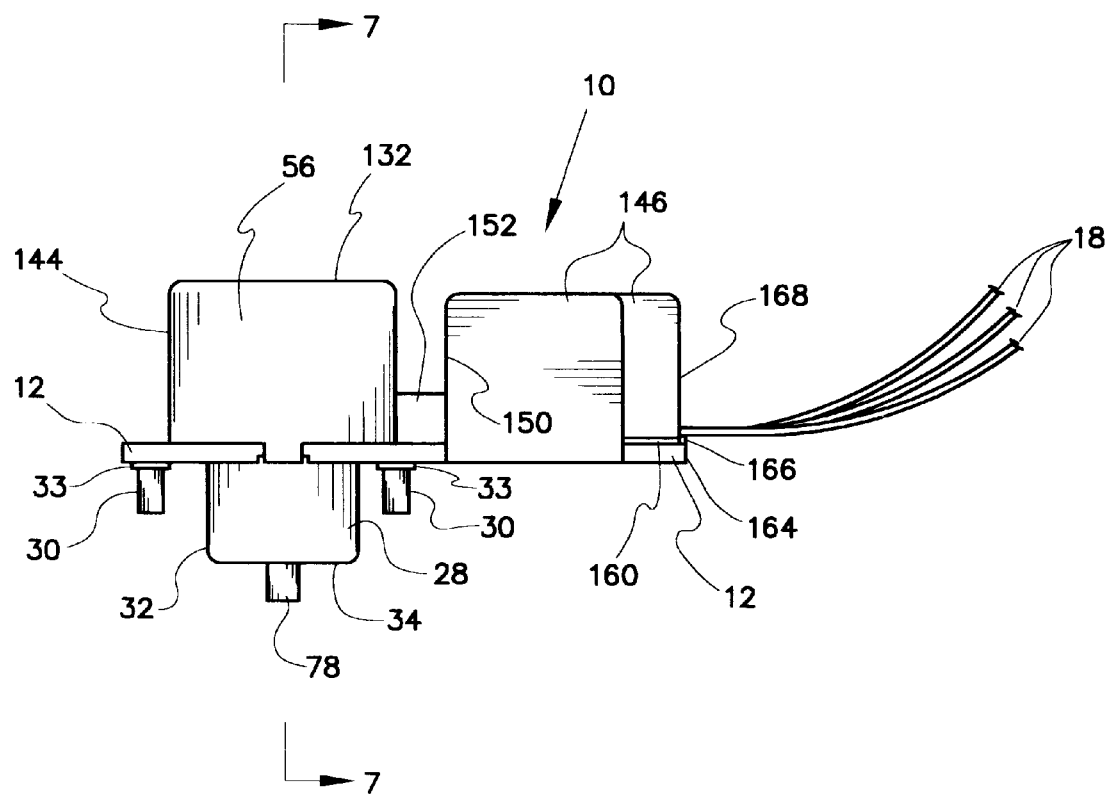
FIG. 5 is a top elevation view of the device in a de-energized position in accordance with the present invention.

Referring to FIGS. 1, 2 and 5, the support member 12 is die cast and fabricated from a non-ferrous material such as ZAMAC3, a material well known to a person having ordinary skill in the art. The support member 12 has planar first and second side walls 24 and 26 with the second side wall 26 having a cylindrically configured plunger support 28 and three mounting posts 30 extending therefrom. The posts 30 include a circumferential depression 31 or "dimple" and elevated plateau 33 surrounding the base of each of the posts 30 to provide more strength to the posts 30 when integrally molded to the support member 12.

Referring to FIGS. 2–5, the plunger support 28 includes a cylindrical outer side wall 32 and an outer, planar, annular top wall 34 having an orifice 36 therethrough. The orifice 36 is axially aligned with and relatively smaller in diameter than the top wall 34. The plunger support 28 further includes an inner recess 38 (see FIG. 2) that axially joins with the orifice 36 thereby forming an inner, planar, annular bottom wall 42. The bottom wall 42 is axially aligned with and relatively larger in diameter than the orifice 36, and relatively smaller in diameter and parallel to the outer top wall 34. The inner recess 38 includes an inner cylindrical side wall 40 having a longitudinal dimension approximately half the longitudinal dimension of the cylindrical outer wall 32 thereby positioning the bottom wall 42 proximally half way between parallel to the outer top wall 34 and the first side wall 24 of the support member 12.

The plunger support 28 further includes a hard metal (such as stainless steel) insert sleeve 43 that is insert molded into the die case support member 12 and extends longitudinally from the outer side wall 32 of the support 28 to the bottom wall 42 of the inner recess 38. The insert sleeve 43 provides a hard metal surface that is capable of withstanding without erosion, sideload forces ultimately generated by an automatic transmission member engaging a component of the solenoid 14 that inserts through and physically contacts the inset sleeve 43.

Figure 7:
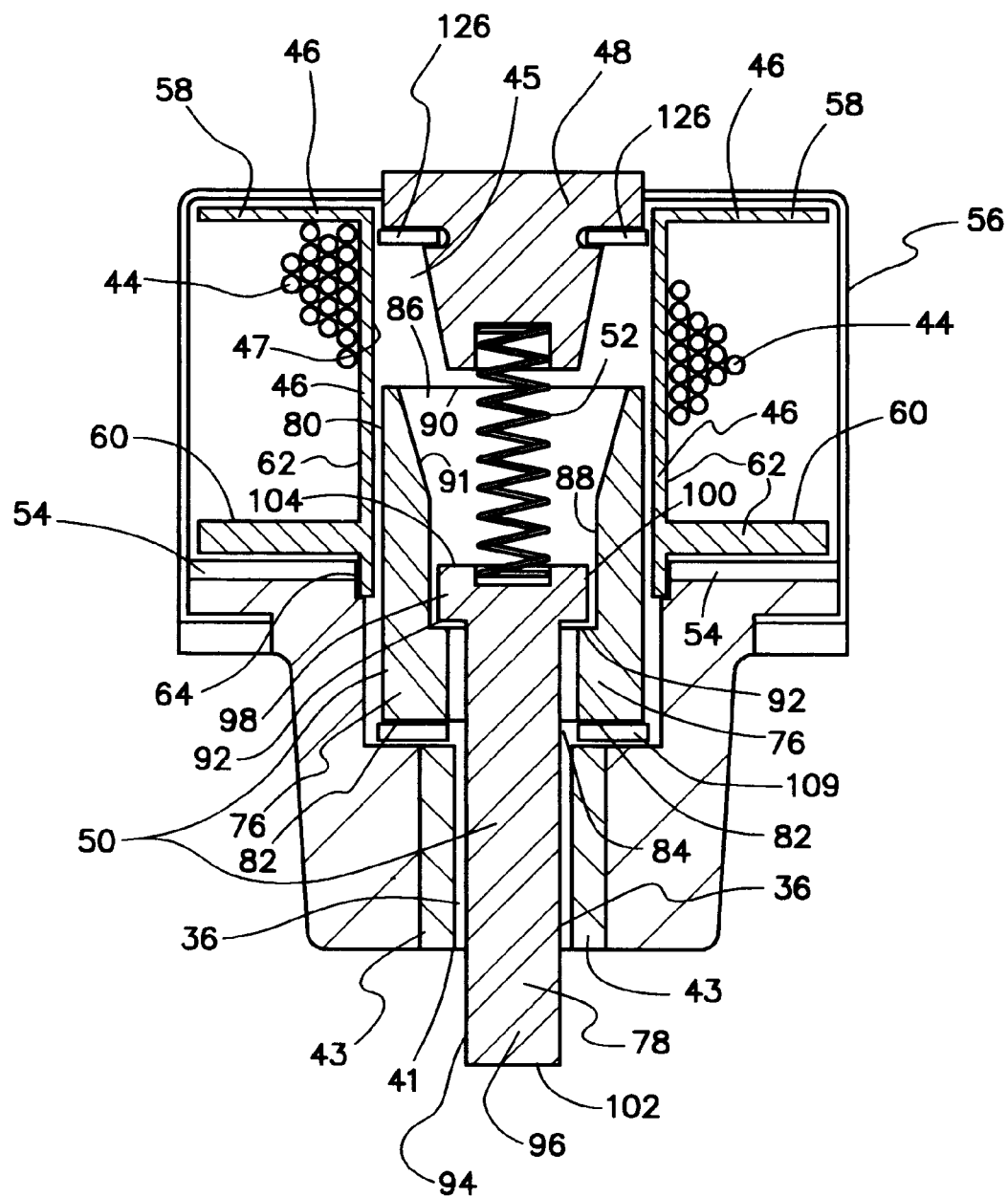
FIG. 7 is a sectional view taken along line 7—7 of FIG. 5.

Referring to FIGS. 1 and 7, the solenoid 14 includes a coil 44 wound on a bobbin 46, a backstop 48, a plunger 50, plunger return spring 52, flux washer 54 and housing 56. The coil 44 is configured to provide sufficient lineal force to move the plunger 50 while laterally engaging an automatic transmission member. The required lineal force is generated by winding a 31 gauge, thin insulation, copper, 27 ohm wire on the bobbin 46 to form approximately 1100 substantially cylindrical turns. The bobbin 46 is fabricated from six-six nylon with a 30% glass fill. The bobbin 46 is cylindrically configured with an axial cavity 45 therethrough, approximately one half inch longitudinally, one inch in diameter at first and second wire retaining walls 58 and 60, and one-half inch in diameter at the cylindrical inner and outer portions 62 and 64, a dimension slightly smaller than the diameter of the recess 38 in the plunger support 28. The provided dimensions are for establishing a relative size of the subject solenoid used in an automatic transmission system, but should not be read as a limitation as to range of applications and sizes that the subject invention may ultimately be used.

The outer portion 64 of the bobbin 46 extends longitudinally a distance sufficient to snugly receive the flux washer 54 and snugly insert into the inner recess 38. To prevent the bobbin 46 and flux washer 54 from rotating upon assembling the solenoid 14, a locking peg 66 is integrally joined to and perpendicularly extends from a conductor support portion 38 of the second wire retaining wall 60 of the bobbin 46. The locking peg 66 is captured in recess 71 in the flux washer 54, and a correspondingly configured aperture 70 in the support member 12 thereby preventing damage to two parallel coil conductors 72 that are joined to the conductor support portion 68. The two coil conductors 72 are configured to radially extend outward from the bobbin 46 a first predetermined distance, then form right angles and continue a second predetermined distance to ultimately be inserted into and captured by respective apertures 74 in the voltage regulating circuit board 16. Portions of the conductors 72 near the conductor support portion 68, are electrically connected to respective ends of the wire forming the coil 44 thereby completing the electrical circuit required to energize the solenoid 14.

Referring to FIG. 7, the plunger 50 includes a first plunger portion 76 that removably receives a second plunger portion 78 therein. Both plunger portions 76 and 78 are fabricated from a ferrous material such as 12 L 14, a metal well known to those of ordinary skill in the art. The first plunger portion 76 includes an outer cylindrical side wall 80, an outer, planar, annular first end wall 82 with an aperture 84 therethrough, and a recess 86 forming an inner cylindrical side wall 88 extending longitudinally from relatively near the first end wall 82 to a position near a second end 90 of the first plunger portion 76 where the recess 86 then expands to form a frustoconical configuration 91 similar to and sized to snugly receive the backstop 48. The inner cylindrical side wall 88 has a diameter relatively larger than the aperture in the outer first end wall 82 thereby forming an inner first end wall 92 in the recess 86 of the first plunger portion 76.

The second plunger portion 78 includes a first outer cylindrical side wall 94 extending longitudinally from a first end 96 of said second portion 78 to a position relatively near a second end 98 of said second portion 78. The second end 98 includes a second outer cylindrical side wall 100 axially aligned with and longitudinally shorter in dimension than the first outer side wall 94. The diameter of the second side wall 100 is relatively larger in diameter than the first side wall 94 thereby providing an enlarged second end 98 in relation to the first end 96. The second plunger portion 78 further includes respective first and second annular, planar end walls 102 and 104. The second end wall 104 includes an annular recess 106 therein axially aligned with and having a diameter proximate to that of the first outer cylindrical sidewall 78, and having an axial depth sufficient to capture a first end 108 of the axially aligned spring 52.

The first end 96 of the second plunger portion 78 inserts into the recess 86 of the first plunger portion 76 via the second end 90 until the first end 96 inserts through the aperture 84 in the outer first end wall 82 of the first plunger portion 76 and the second end 98 of the second plunger portion 78 engages the inner first end wall 92 in the recess 86 of the first plunger portion 76.

Figure 8:
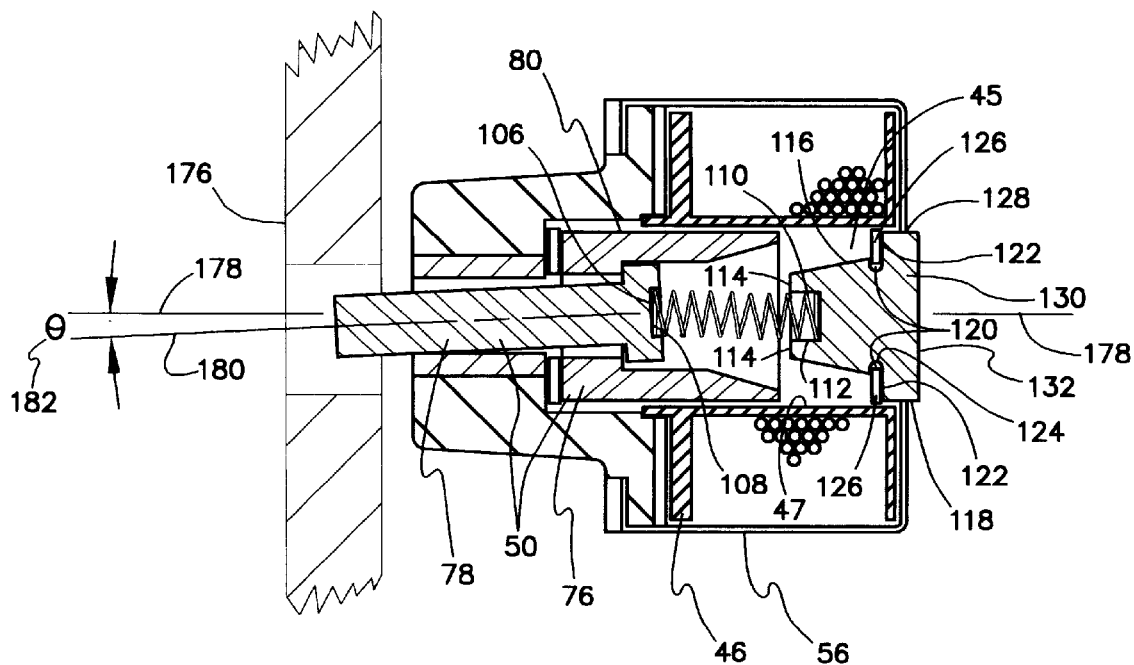
FIG. 8 is a sectional view taken along line 8—8 of FIG. 3. A portion of a transmission member is included to illustrate the positioning of the device in accordance with the present invention.

Referring to FIGS. 1 and 8, the first outer cylindrical side wall 94 of the second plunger portion 78 engages an inner cylindrical wall 41 of the insert sleeve 43 in the plunger support 28. The orientation of the device 10 is such that the longitudinal axis 178 of the first plunger portion 76 is horizontally positioned causing the longitudinal axis 180 of the second plunger portion 78 to misalign and offset with the longitudinal axis 178 of the first plunger portion 76. However, the longitudinal axis of the first portion 76 isimaintained in axial alignment with the longitudinal axis of the bobbin 46 thereby preventing the outer wall 80 of the first portion 76 from binding with an inner cylindrical wall 47 forming the bobbin cavity 45 that receives the plunger 50. This "anti-binding" and/or friction reducing feature of the two piece plunger 50 requires less lineal force to move the plunger 50 from a first to a second predetermined position. The reduced lineal force allows the solenoid 14, corresponding internal components and power supplying circuit board 16 to be reduced in size, providing increased flexibility when installing the device 10. If the plunger 50 did not have two separate portions 76 and 78, but instead had a "unibody" construction, the portion extending outside the plunger support 28 would cause the portion inside the bobbin 46 to become axially misaligned with the bobbin 46 which would increase binding between the bobbin 46 and the plunger 50 and would require more lineal force to move the plunger 50.

Figure 9:
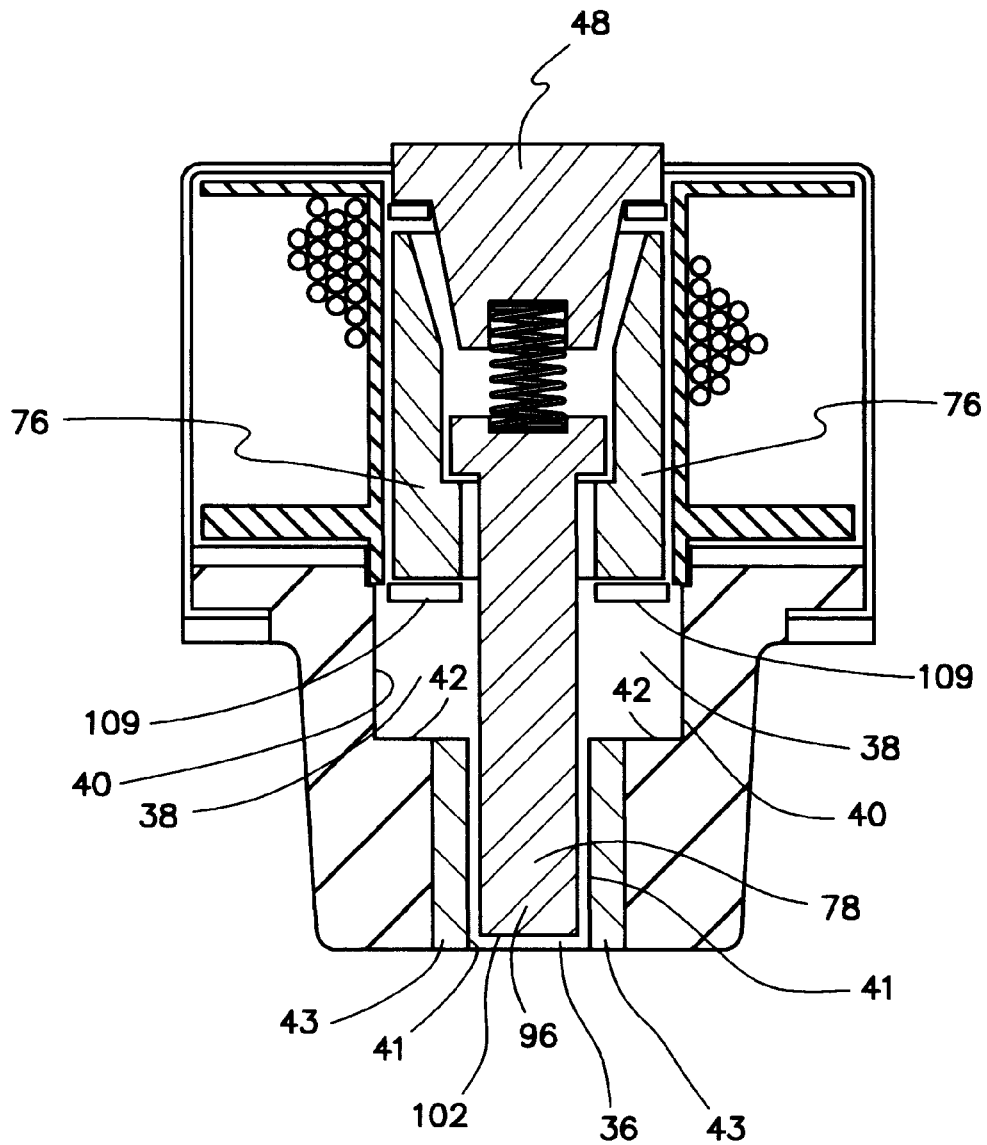
FIG. 9 is the same sectional view of FIG. 7 except that the device is at an energized position.

Referring to FIGS. 1, 7 and 9, the spring 52 is substantially cylindrically shaped and capable of being compressed by the movement of the plunger 50 from a first to a second predetermined position when the solenoid 14 is energized; and capable of moving the plunger 50 back to the first position when the solenoid 14 is de-energized. A rubber washer 109 is secured to the outer first end wall 82 of the first plunger portion 76 to reduce the noise and physical wear generated by the outer first end wall 82 of the first plunger portion 76 forcibly engages the bottom wall 42 of the inner recess 38 of the plunger support 28 when the spring moves the plunger 50 back to the first position. The spring 52 includes a second end 10 that is captured by an annular recess 112 in a first end wall 114 of the backstop 48 that is axially aligned with the spring 5 and plunger 50. The recess being dimensioned to snugly receive the second end 110 of the spring 52.

Figure 11:
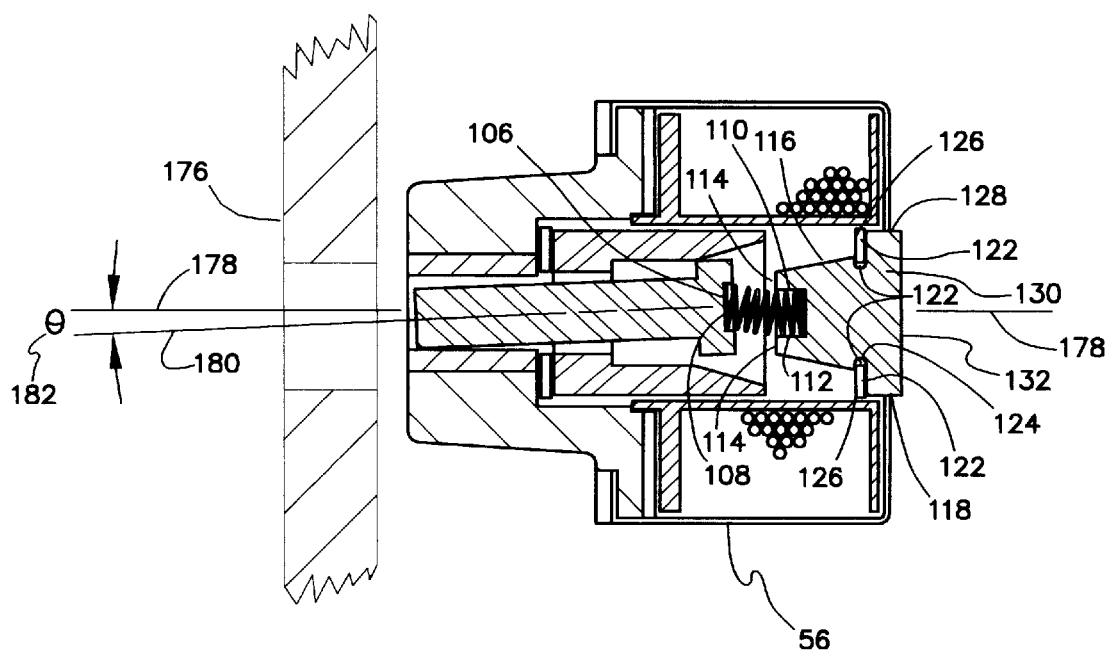
FIG. 11 is the same sectional view of FIG. 8 except that the device is at an energized position.

Referring to FIGS. 1 and 11, the backstop 48 is fabricated from the same ferrous material (12 L 14) as the plunger 50. The backstop 48 includes a frustoconically configured first portion 116, a cylindrically configured second portion 118 and an annular recess 120 therebetween. The configuration of the first portion 116 provide guidance to the plunger 50 as the first portion 116 inserts into the recess 86 when the plunger 50 moves from first to second predetermined positions when the solenoid 14 is energized. The plunger 50 ultimately contacts an inner, planar, annular wall 122 on the second portion 118 formed from the larger diameter of second portion 118 in relation to the smaller diameter of the base 124 of the first portion 116. To prevent excessive noise that would be generated from the plunger 50 contacting with the inner wall 122, a rubber washer 126 is snugly positioned and secured around the recess 120 to receive the second end 90 of the first plunger portion 76 thereby preventing direct contact with the inner wall 122 and the resulting noise that would ultimately be generated.

The second portion 110 of the backstop 48 forcibly inserts through an aperture 128 in a center portion of the housing 56 such that a small end portion 130 extends axially beyond the surface a planar outer wall 132 of the housing 56. To secure the position of the backstop 48 in the housing 56, four equally spaced punches 134 or "stakes" are provided at the perimeter of the end portion 130 to "push" a small section of metal from the end portion 130 onto the planar outer wall 132 of the housing 56.

Figure 10:
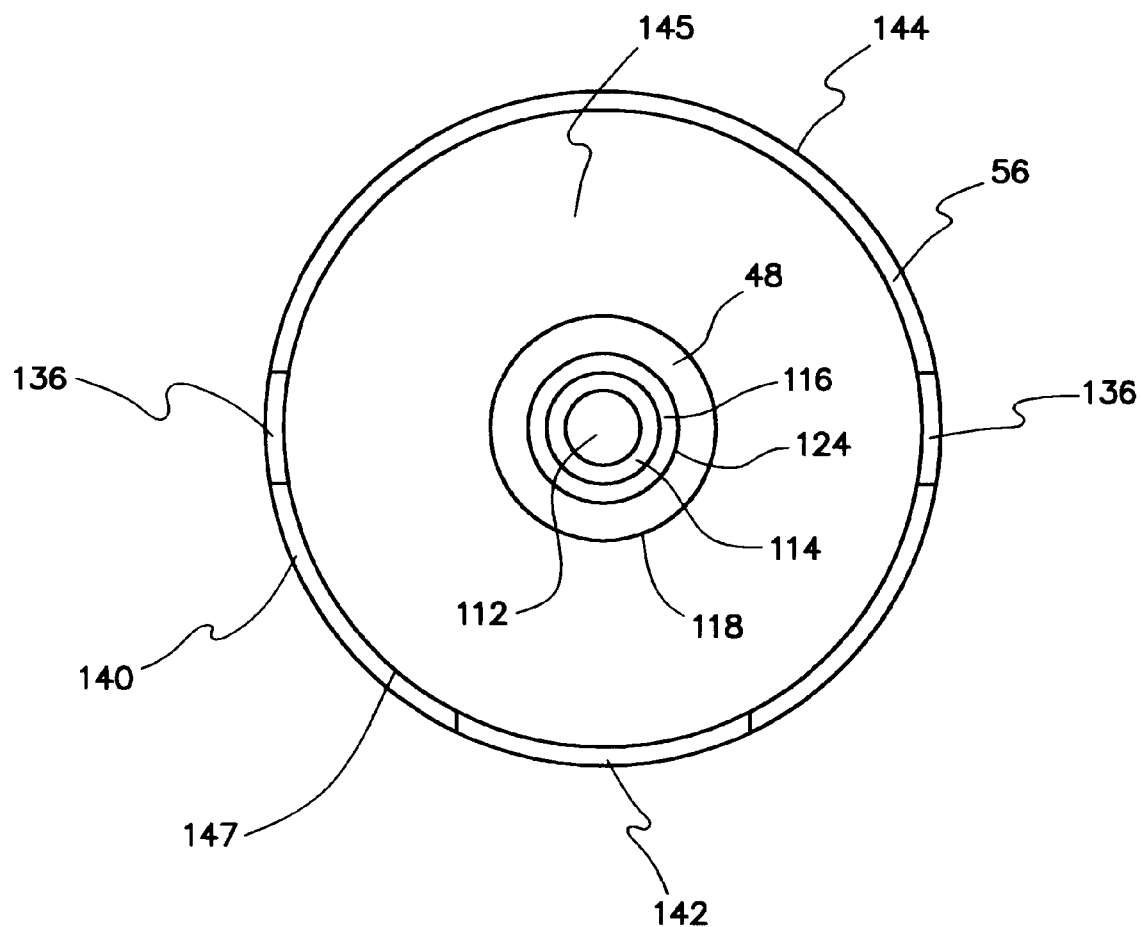
FIG. 10 is a bottom elevation view of the housing with the backstop secured therein in accordance with the present invention

Referring to FIGS. 1 and 10, the housing 56 is fabricated from a ferrous material such as C-1008 or C-1010, a low carbon, low led metal well known to those of ordinary skill in the art. The housing 56 is secured to the support member 12 via two retaining lugs 136 that are received by two retaining recesses 138 in the second side wall 26 of the support member 12. The retaining lugs 136 are integrally joined to an annular edge 140 defined by a cylindrical side wall 144 that forms a cavity 145 in the housing 56. The annular edge 140 defines a cylindrical aperture 147 for the cavity 145. The aperture 147 snugly receives the flux washer 54 so as to position a planar outer wall 149 of the flux washer 54 parallel with the annular edge 140. The annular edge 140 of the housing 56 is positioned on the firs side wall 24 of the support member on the first side wall 24 of support member 12 whereupon the retaining lugs 136 are forcibly bent to engage the recesses 138 thereby securing the housing 56 to the support member 12. A rectangular configured recess 142 is provided in a lower portion of the cylindrical side wall 144 of the housing 56 to allow the conductors 72 to extend from the bobbin 46 to the circuit board 16.

Referring to FIGS. 1 and 7, the flux washer 54 is fabricated from the same ferrous material (C-1008 or C-1010) as the housing 56. The flux washer 54 serves to complete the magnetic circuit of the assembled solenoid 14 by directing magnetic flux lines generated by the energized coil through the housing 56, then through the backstop 48, the plunger 50 to ultimately be received and re-directed by the flux washer 54.

Figure 4:
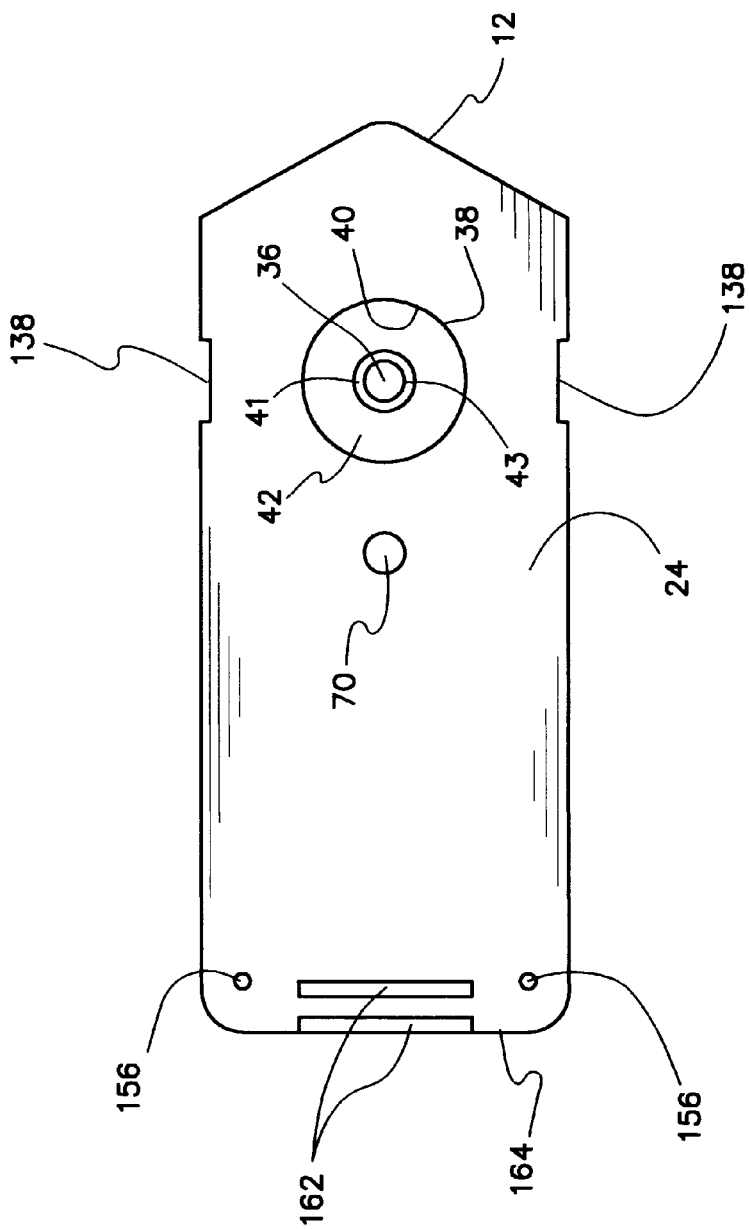
FIG. 4 is a back elevation view of a support member for the device in accordance with the present invention.

Referring to FIGS. 1, 4 and 5, the circuit board 16 is ultimately captured by a circuit board enclosure 146. The enclosure 146 includes a rectangular recess 148 in a first side wall 150 to permit the conductors 72 from the bobbin 46 to extend into the enclosure 146 and insert into respective apertures 74 in the circuit board 16. A shield 152 protrudes perpendicularly from the perimeter of the recess 148 to provide a cover and mechanical protection to the conductors 72. The shield 152 includes an arcuate edge portion 154 that congruently engages the cylindrical sidewall 144 of the housing 56 to totally encase the conductors 72 to provide maximum mechanical protection without physical contact with the shield 152 or the first sidewall of the support member 12.

The enclosure 146 is fastened to the support member 12 by flattening or "coining" two fastening lugs 156 on the first side wall 24 of the support member 12 through two fastening orifices 158 in lower, planar, retaining portions 160 of the enclosure 146. The enclosure 146 is positioned between two parallel ribs 162 positioned on the second side wall 26 of the support member 12, longitudinally parallel with and adjacent to a first lateral side edge 164 of the support member 12. The ribs 162 are longitudinally dimensioned to extend snugly between the two retaining portions 160 of the enclosure 146, and laterally separated a distance to snugly receive a lower edge portion 166 of a second side wall 168 of the enclosure 146. The side wall 168 includes three slots or apertures 170 at the lower edge portion 166 between the two retaining portions 160 of the enclosure 146 to provide enclosure access to the three wires 18 extending from the receptacle 20 to the circuit board 16.

Figure 6:
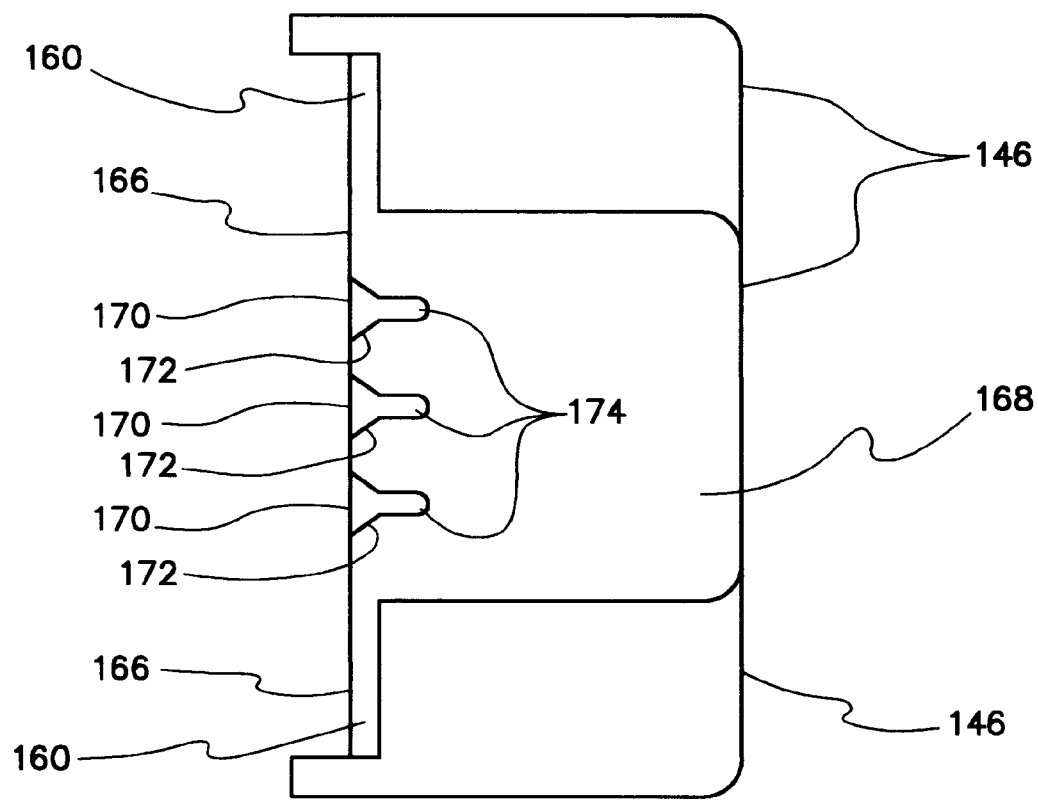
FIG. 6 is a side elevation view of a circuit board housing.

Referring to FIGS. 1 and 6, the apertures 170 have a frustoconical configured lower portion 172 extending upward a relatively short distance from the lower edge portion 166, and joining with an elongated, relatively semi-circular upper portion 174 having radial dimension slightly smaller than the radial dimension of the wires 18 to forcibly receive and retain the wires 18 therein. The portion of the wires ultimately inserted into the apertures 170 is determined by the secured positioning of the circuit board 16 inside the enclosure 146. Irrespective of the portion of the wires 18 secured in the apertures 170, once the wires 18 are inserted and the enclosure 146 attached to the support member 12 with the ribs 162 receiving the lower edge 166 of the sidewall 168 therebetween, the wires 18 are forcibly pushed up into the upper portions 174 of the apertures 170 and are locked in place thereby preventing movement of and providing strain relief for the wires 18 at the enclosure 146 entry apertures 170 when the assembled enclosure 146 and support member 12 experience movement during operation of an automatic transmission shifter.

Referring to FIGS. 1, 7 and 8, the solenoid 14 is assembled and attached to the support member 12 such that in a de-energized state, the spring 52 is compressed to a first position capable of generating sufficient force to urge the second end 98 of the second plunger portion 78 into forcible engagement with the inner wall 92 of the first plunger portion 76 thereby inserting the first end 96 of the second plunger portion 78 through the orifice 36 in the sleeve 43 and beyond the planar wall 34 of the plunger support 28 to a position that obstructs movement of an automatic transmission member 176 when the automobile transmission shifter is in the park position.

Referring to FIGS. 1, and 7–9, in operation, the device 10 is mounted to a movable component in an automatic transmission system such that the second plunger portion 78 is extending longitudinally through the plunger support 28. The second plunger portion 78 is positioned to engage and obstruct a member 176 of the automatic transmission system from moving to a second predetermined position that would allow the automatic transmission shifter to be moved from a park position.

When a person requires that the shifter be moved from the park position, a signal is generated by depressing the brake pedal. The signal is directed to the device 10 whereupon the solenoid 14 is energized. When the solenoid 14 is energized, a magnetic flux is generated by the coil 44 and directed through the ferrous components (housing 56, plunger 50, backstop 48 and flux washer 54) thereby generating a lineal force that moves the first and second plunger portions 76 and 78 to a second position that further compresses the spring 52 and retracts the first end 96 of the second plunger portion 78 within the sleeve 43 of the plunger support 28 to a position that allows the automatic transmission shifter to move from the park position. The two part plunger 50 reduces the required lineal force to move the plunger 50 while the second plunger portion 78 laterally engages a cylindrical inner wall 41 of the insert sleeve 43. The first plunger portion 76 and the insert sleeve 43 are horizontally positioned causing the second portion 78 to "rest" upon the inner wall 41 of the sleeve 43 thereby misaligning the longitudinal axes 178 and 180 of the first and second plunger portions 76 and 78 so as to form an offset angle θ 182. However, the first plunger portion 76 is allowed to maintain axial alignment with the bobbin 46 thereby minimizing frictional engagement with the inner wall 45 of the axial cavity 45 of the bobbin 46. The reduction of frictional engagement reduces the lineal force required to move the plunger 50.

After moving the shifter to the desired position, the brake is released and the solenoid is de-energized which removes the lineal forces holding the plunger 50 and the compressed spring 52 at the second position. Once the lineal force is removed, the force generated by the compressed spring 52 is sufficient to return the plunger 50 back to the de-energized first position so long as no transmission member is obstructing the path of travel of the second plunger portion 78. Should a transmission member block the return of the second plunger portion 78 to the first position, the spring 52 would cause the second plunger position 78 to forcibly engage the transmission member without affecting operation of the transmission until the transmission shifter is returned to the park position. The second plunger portion 78 and the first plunger portion 76 would be forcibly returned to respective first positions by the spring 52 upon the shifter returning to the park position.

Obviously, many modifications and variations of the present invention are possible in light of the above teachings. Thus, it is to be understood that within the scope of the appended claims, the invention may be practiced otherwise than as specifically described above.

What is claimed and desired to be secured by Letters Patent of the United States is:

1. A brake-transmission shift interlock device for an automatic transmission system comprising:

a support member;

a solenoid secured to said support member, said solenoid including a plunger member;

means for moving said plunger member from a first portion to a second position;

means for moving said plunger member from said second position to said first position;

means for preventing movement of an automatic transmission shifter; and means for preventing binding of said plunger with a portion of a bobbin member promoting thereby movement of said plunger from said first position to said second position.

2. The device of claim 1 wherein said binding prevention means includes said plunger having first and second portions, said first plunger portion being dimensioned to slidably insert into said bobbin member of said solenoid, said second plunger portion being dimensioned to slidably insert through a sleeve member of said support member a distance that proximally positions a sidewall of said second plunger portion adjacent to an automatic transmission member.

3. The device of claim 1 wherein said binding prevention means includes said plunger having a first plunger portion that removably receives a second plunger portion via an aperture in an outer first end wall of said first plunger portion such that a first end of said second plunger portion is positioned a predetermined distance from said outer first end wall of said first plunger portion thereby positioning a sidewall of said second plunger portion adjacent to an automatic transmission member, and means for maintaining the position of said first end of said second plunger portion in relation to said outer end wall of said first plunger portion.

4. The device of claim 3 wherein said position maintaining means includes means for configuring a second end of said second plunger portion such that said second end is slightly larger than said aperture in said first plunger portion end wall; means for providing a recess in said first plunger portion, said recess having an internal cylindrical wall with a diameter relatively larger than said second end of said second plunger portion thereby allowing said first end of said second plunger portion to be inserted into said recess and through said aperture in said first end until said second end of said second portion of said plunger engages an inner wall of said first end of said first plunger portion; and means for forcing said second end of said plunger portion against said inner wall of said first end of said first plunger portion.

5. The device of claim 4 wherein said forcing means includes a spring having a first end removably received in a recess in said second end of said second plunger portion, and a second end of said spring removably received in a recess in a backstop member of said solenoid thereby urging said second end of said second plunger portion against said inner wall of said first end of said first plunger portion.

6. The device of claim 1 wherein said binding prevention means includes means for axially misaligning said first and second plunger portions thereby reducing friction between said first plunger portion and said bobbin member to reduce the power required to move said first plunger portion from a first position to a second position when said solenoid is energized.

7. A solenoid device for interrupting operation of an automatic transmission system comprising:
  a plunger having a first portion positioned in a bobbin member of said solenoid device, and a second portion positioned external to a housing member of said solenoid device;
  means for moving said first plunger portion from a first position to a second position;
  means for returning said first plunger portion from said second position to said first position;
  means for preventing movement of an automatic transmission shifter; and
  means for preventing binding of said first plunger portion with an inner wall of said bobbin member.

8. The solenoid device of claim 7 wherein said first plunger moving means includes a coil circumferentially wound on said bobbin, said coil having a voltage impressed thereupon generating a magnetic field; and means for directing said magnetic field such that said first plunger portion is moved from said first position to said second position in cooperative engagement with a backstop member of said solenoid device.

9. The solenoid device of claim 7 wherein said first plunger return means includes a spring being compressed by said movement of said first plunger portion from said first to said second position; and means for de-energizing said coil, said spring compression generating sufficient force to return said first plunger portion from said second position to said first position upon said coil being de-energized.

10. The solenoid device of claim 7 wherein said binding prevention means includes means for dimensioning said second plunger portion to slidebly insert through a sleeve member of a support member of said solenoid device to position a wall portion of said second plunger portion proximate to an automatic transmission member thereby interrupting movement of said automatic transmission member.

11. The solenoid device of claim 7 wherein said binding prevention means includes said first plunger portion having a first end with an orifice therethrough and a second end with a cylindrical recess relatively larger than said orifice and extending axially and cooperating with said orifice to form an inner wall relatively close to said first end of said first plunger portion, said second plunger portion having a first end that inserts into said first plunger portion via said cylindrical recess and extends a distance from said first end of said first plunger portion determined by the configuration of a second end of said second plunger portion, said second end configuration being relatively smaller than said cylindrical recess and relatively larger than said orifice thereby allowing said second end to engage said inner wall of said first plunger portion; and means for biasing said second end of said second plunger portion against said inner wall of said first plunger portion.

12. The solenoid device of claim 11 wherein said biasing means includes a spring having a first end removably received in a recess in said second end of said second plunger portion, and a second end of said spring removably received in a recess in a backstop member of said solenoid device.

13. The solenoid device of claim 7 wherein said first plunger portion movement means includes means for axially misaligning said first and second plunger portions thereby reducing friction between said first plunger portion and a bobbin member to reduce the power required to move said first plunger portion from a first position to a second position when said solenoid is energized.

14. A voltage regulating solenoid device for interrupting operation of an automatic transmission system comprising:
  a solenoid;
  a voltage regulating circuit;
  a housing for said voltage regulating circuit;
  a support member secured to a moving component of said transmission system, said support member having said solenoid and said voltage regulating circuit attached thereto;
  multiple conductors for providing power to said voltage regulating circuit, said conductors having a first end secured to a stationary member of said automatic transmission system and a second end secured to said housing for said voltage regulating circuit;
  means for preventing movement of said seconds ends of said conductors entering said housing;
  means for preventing movement of an automatic transmission shifter when first predetermined conditions are satisfied; and
  means for allowing movement of said automatic transmission shifter when second predetermined conditions are satisfied.

15. The solenoid device of claim 14 wherein said wire movement prevention means includes said circuit housing having apertures therethrough corresponding to the number of conductors to said housing, said apertures having a tapered configuration to forcibly fit said individual conductors therein; and said support member having two parallel ribs spaced apart a distance to snugly receive a wall portion of said housing therebetween, said ribs being longitudinally dimensioned to engage all conductors, said ribs extending perpendicularly to said support member a predetermined distance to forcibly urge said conductors into said tapered apertures thereby preventing movement of said conductors entering said housing and providing strain relief for said conductors.

16. The solenoid device of claim 14 wherein said automatic transmission shifter movement preventing means includes a plunger having a first and second portions, said first plunger portion being dimensioned to slidably insert into a bobbin member of said solenoid, said second plunger portion being dimensioned to slidably insert through a sleeve member of said support member a distance that proximally positions a sidewall of said second plunger portion adjacent to an automatic transmission member.

17. The solenoid device of claim 14 wherein said binding prevention means includes said first plunger portion having a first end with an orifice therethrough and a second end with a cylindrical recess relatively larger than said orifice and extending axially and cooperating with said orifice to form an inner wall relatively close to said first end of said first plunger portion, said second plunger portion having a first end that inserts into said first plunger portion via said cylindrical recess and extends a distance from said first end of said first plunger portion determined by the configuration of a second end of said second plunger portion, said second end configuration being relatively smaller than said cylindrical recess and relatively larger than said orifice thereby allowing said second end to engage said inner wall of said first plunger portion; and means for biasing said second end of said second plunger portion against said inner wall of said first plunger portion.

18. The solenoid device of claim 17 wherein said biasing means includes a spring having a first end removably received in a recess in said second end of said second plunger portion, and a second end of said spring removably received in a recess in a backstop member of said solenoid device.

19. The solenoid device of claim 14 wherein said automatic transmission shifter movement allowing means includes means for axially misaligning first and second plunger portions when said second plunger portion engages an inner wall of an insert sleeve thereby reducing binding between said first plunger portion and a bobbin member to reduce the power required to move said first plunger portion from a first position to a second position when said solenoid is energized.

20. The solenoid device of claim 14 wherein said automatic transmission shifter movement allowing means includes means for axially aligning a first plunger portion and a bobbin member while a second plunger portion engages an inner wall of a plunger support.

* * * * *